(12) United States Patent
Reed, III

(10) Patent No.: US 10,000,165 B2
(45) Date of Patent: *Jun. 19, 2018

(54) PICKUP TRUCK MOUNTED TOOLBOX

(71) Applicant: Thomas Inard Reed, III, Aurora, CO (US)

(72) Inventor: Thomas Inard Reed, III, Aurora, CO (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/245,696

(22) Filed: Aug. 24, 2016

(65) Prior Publication Data

US 2016/0362070 A1    Dec. 15, 2016

Related U.S. Application Data

(63) Continuation-in-part of application No. 14/578,029, filed on Dec. 19, 2014.

(51) Int. Cl.

| | |
|---|---|
| *B60R 11/06* | (2006.01) |
| *B60Q 1/00* | (2006.01) |
| *B60Q 1/44* | (2006.01) |
| *B60P 3/14* | (2006.01) |

(52) U.S. Cl.
CPC ............ *B60R 11/06* (2013.01); *B60P 3/14* (2013.01); *B60Q 1/0035* (2013.01); *B60Q 1/44* (2013.01)

(58) Field of Classification Search
CPC ...... B60R 9/00; B60R 11/06; B60R 2011/004
USPC .............................. 224/404; D12/414.1, 423
See application file for complete search history.

(56) References Cited

U.S. PATENT DOCUMENTS

| | | | | |
|---|---|---|---|---|
| 2,849,201 | A * | 8/1958 | Schelgunov | A47B 91/00 16/42 R |
| 4,420,238 | A | 12/1983 | Felix | |
| 5,018,779 | A * | 5/1991 | Lund | B62D 35/001 296/180.1 |
| D320,372 | S | 10/1991 | Alberts | |
| 5,297,707 | A | 3/1994 | Weber | |
| D369,140 | S * | 4/1996 | Sills | D12/414.1 |
| D374,654 | S * | 10/1996 | Steketee | D12/414.1 |
| 5,685,467 | A * | 11/1997 | Niemi | B60R 9/00 220/23.83 |
| 6,616,210 | B1 | 9/2003 | Massey | |
| 6,726,074 | B2 * | 4/2004 | Boys | B60R 9/00 224/482 |
| 8,038,195 | B1 * | 10/2011 | Hutcheson | B60R 9/00 296/136.04 |
| 8,348,331 | B2 | 1/2013 | Holt | |

(Continued)

OTHER PUBLICATIONS

Welcome to Quickdraw, accessed Aug. 24, 206, www.quickdrawtoolboxes.com.

*Primary Examiner* — Adam Waggenspack
(74) *Attorney, Agent, or Firm* — Craig W. Barber; Barber Legal

(57) ABSTRACT

A pickup truck toolbox can be mounted to the bed side rails by a variety of interchangeable feet rather than arms and may sit above the bed, thus allowing use of the full volume of the bed, for example for 4'×8' sheets of building material. It may have a rear view tunnel through it either top or bottom, whereby the driver may use normally the rear view mirror, and may have a Liddy light valley across the top, whereby the brake light will remain visible. A bed light or rear view camera may be employed as well. A fairing may be employed to improve fuel efficiency.

14 Claims, 23 Drawing Sheets

(56) References Cited

U.S. PATENT DOCUMENTS

2003/0230909 A1* 12/2003 Melius .................... B60J 7/067
                                                          296/98
2013/0021453 A1   1/2013 Gignac
2013/0181023 A1* 7/2013 Shawanda ................ B60R 9/06
                                                          224/403

* cited by examiner

FIG. -10-

PICKUP TRUCK MOUNTED TOOLBOX

CROSS-REFERENCE TO RELATED APPLICATIONS

This invention claims the derived priority and benefit of U.S. Patent Application No. 61/964,000 filed Dec. 20, 2013 in the name of the same inventor, Thomas Inard Reed III, and entitled "Topbox" of which the entire application including disclosures are incorporated herein by reference, by means of claiming the priority and benefit of U.S. Utility application Ser. No. 14/578,029 filed Dec. 19, 2014, in the name of the same inventor, Thomas Inard, Reed III, entitled "Pickup Truck Mounted Toolbox", of which the entire application including disclosures are incorporated herein by this reference, of which this application is a continuation-in-part.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

FIELD OF THE INVENTION

This invention relates generally to toolboxes, and specifically to toolboxes mounted behind the cabs of pickup trucks.

STATEMENT REGARDING FEDERALLY FUNDED RESEARCH

This invention was not made under contract with an agency of the US Government, nor by any agency of the US Government.

BACKGROUND OF THE INVENTION

Toolboxes for pickup truck usage are large boxes which extend into the bed volume of a pickup truck, that is, the toolbox sits projecting downward between the side rails of the pickup truck bed, with a pair of arms on the upper end which arms extend outward to sit upon the tops of the side rails of the bed.

Thus, a considerable amount of bed space is taken up.

An example of a conventional prior art pickup truck toolbox may be seen in FIG. 9, labeled PRIOR ART.

Cab 54 and bed 20 meet at the front end of the bed 20 and the toolbox is disposed at that location. Arm 12 sits atop the side rails 10 of the bed 20, however, the body of the toolbox extends downward into the bed volume 20 until it comes to rest on the floor of the bed or perhaps on just above the floor of the bed 20.

PRIOR ART FIG. 8 shows this as well: the toolbox extends completely into the bed, preventing the use of the bed for storage. Thus the gate 203 at the end of the bed must be opened for longer cargo, or the cargo must be placed with one or both ends above the toolbox or gate, rendering the vehicle difficult to drive and offering the chance that the cargo (such as motorcycle 114) might fall out.

Tonneau cover 14 may be seen in FIG. 9 to be opened and the prior art toolbox extends so far down into the bed volume that it is actually visible UNDER the tonneau cover 14. It is worth noting that the tonneau cover 14 must be shorter than the length of the bed 20 in order to allow for the length of the toolbox.

Finally, it will be seen that the top-mounted hatch 50 opens upward. This means that a user of the toolbox must open the hatch and then reach down in order to rummage for the desired tool. Obviously given the configuration seen, shelves would be difficult to employ since the topmost shelf would block the view of all the lower shelves.

In alternative configurations, the top hatch is broken into two smaller hatches with are hinged at the middle of the width of the toolbox, so they open upward from the side, not from the back of the toolbox.

It may be seen that having doors on the sides of the toolbox is impossible, since they could not open due to the presence of the side rails, blocking them.

The toolbox shown could not be raised up and placed over the bed of the pickup truck for a number of reasons. First, it would entirely block the view of the driver to the rear, preventing any usage of the rear view mirror. Second, it would prevent drivers and pedestrians behind the pickup from seeing the center high mounted brake light (not shown by the prior art FIG. 9). In addition, the arms which project from the top of the toolbox would not secure it to the sidewalls. Finally, the top opening hatch would no longer be accessible without climbing on top of the roof of the cab of the truck or by removing the tonneau to allow entering the bed and then walking forward to the toolbox.

Significantly, the toolbox forces the dedication of a substantial portion of the bed volume to itself. The toolbox is a very heavy device and it is not practical to frequently install and remove it: once installed, it is nearly permanent. Thus the user loses a portion of the benefit of having a pickup truck.

One example of an alternative type of toolbox may be found at www.quickdrawtoolboxes.com, which shows a gun safe or tool box for placement across the back of a flat bed or pickup truck. This type of box has a low profile to avoid interfering with the field of view of the rear view mirror and to avoid blocking visibility of the third brake light.

However, this box does not teach any way to increase the height safely and thus to increase cargo capacity upward.

In addition, it has a sliding rack mechanism to bring out racks/bins (either gun racks in the gun embodiment, or tool bins in the others). This sliding mechanism is required in order to offer access to space near the centerline of the bed, but the mechanism comes at a cost in weight. It also takes up space within the box (which as noted cannot be very tall for safety reasons), adds cost in manufacturing, and requires a large amount of space on the side of the parked vehicle in order to be opened at all. Such mechanisms are subject to jamming, of course, rather like a kitchen drawer.

Worst of all, it is easy to imagine the sliding bin mechanism popping out as the vehicle goes around a corner, after which the vehicle will have a projection apparently in excess of four feet wide sticking out one side.

Finally, horizontal shelves are once again impossible in this design.

U.S. Pat. No. 5,685,467 (Niemi) teaches a typical design which sits inside of a cargo bed. Niemi very explicitly teaches legs which sit on the floor of the bed, "spaced apart" (four feet is mentioned repeatedly in Niemi) and which fit within the sidewalls "independent" of the sidewalls.

U.S. Pat. No. D374,654 to Steketee (Oct. 15, 1996) teaches a truck mounted toolbox having no feet and lacking any tunnel which extends from the bottom upward.

Thus it would be preferable to provide a pickup toolbox which does not take up any bed space.

It would even more be preferable to provide a pickup tool box or storage box which has interchangeable or adjustable feet so that it can fit onto various types of pickup truck beds, so long as they are the same width.

It would further be preferable to provide a pickup truck storage box/tool box which has a lower profile and lower weight for smaller tool/storage needs.

It would further be preferable to provide a pickup toolbox which allows easy access without rummaging downward.

It would further be preferable to provide a pickup toolbox which does not require the use of a tonneau of a different size than the bed volume's top surface.

It would further be preferable to provide a pickup toolbox which allows the use of shelving for tools, but without blocking the view of users.

It would further be preferable to provide a pickup toolbox which meets all of these requirements and yet fulfills basic safety standards by NOT blocking the view of the third brake light.

It would further be preferable to provide a pickup toolbox which meets all of these requirements and yet fulfills basic safety standards by NOT blocking the usage by the driver of the rear view mirror.

It would further be preferable to provide a pickup truck tool box/storage box which has a visibility tunnel either extending up from the bottom surface or down from the top surface.

It would yet further be preferable to provide a pickup truck tool/storage box which offers an extra CHSML light, a bed light, a rear view camera, or combinations thereof in a single housing.

SUMMARY OF THE INVENTION

General Summary

The present invention teaches a pickup truck toolbox which can be mounted to the bed side rails and sit well above them instead of projecting downward into the bed. The toolbox is secured to the top of the siderails by feet rather than arms, the feet disposed on the bottom of the toolbox. This allows for a wider box—since conventional boxes must sit in between the side rails, they must be narrower than the side rails, whereas the toolbox of the present invention sits above the side rails and projects out to their edges in embodiments.

Since the present invention may sit above the side rails and the bed volume, it occupies none of the space between the side rails thus allowing use of the full volume of the bed between the side rails and the floor of the bed. By this means the cargo capacity of the pickup truck is reduced by a smaller factor than for conventional toolboxes.

Since the toolbox sits above the side rails and behind the cab of the pickup truck, safety issues may arise, in particular from blockage of either the view of the driver when using the rear view mirror or from blocking visibility of the center mounted third brake light to other drivers. However, the invention may have a rear view tunnel through the lower portions, whereby the driver may use normally the rear view mirror, and may have a Liddy light valley across the top, whereby the brake light will remain visible to others behind the vehicle.

Fuel efficiency is always an issue when discussing truck equipment. In particular, profile (meaning herein frontal profile or frontal cross-section) must be maintained to be within the original profile of the truck cab. The profile of the toolbox of the present invention may generally match, be similar to, or sit within, the profile of the cab of the truck.

Furthermore, a fairing may be employed to improve fuel efficiency by eliminating the space between the pickup cab and the toolbox and thus preventing the swirl of air therebetween.

Side-mounted vertical hatches may allow both easier access than conventional toolboxes for pickups which open upward. The side mounted vertical hatched even allow the use of shelving within the interior space of the toolbox of the invention, thus allowing superior organization of tools and extremely efficient utilization of space, as well as convenience of access. The shelves may be removable, so that a larger space can be created when necessary.

Summary in Reference to Claims

It is therefore another aspect, advantage, objective and embodiment of the invention, in addition to those discussed previously, to provide a tool box/storage box for use on a pickup truck having a bed, the bed having two side rails separated by a bed width, the side rails having side rail tops defining a bed height and a bed volume, the pickup truck also having a cab profile and a cab height, a rear view mirror, and a third brake light, the storage box comprising:

a body having a top surface, a bottom surface, a storage box height, a storage box width, and two bottom ends disposed separated from one another by such bed width;

the two bottom ends being dimensioned and configured to mount to such side rail tops, whereby;

the storage box takes up no space between such bed side rails within such bed volume.

It is therefore another aspect, advantage, objective and embodiment of the invention, in addition to those discussed previously, to provide a tool box/storage box for use on a pickup truck having a bed, the bed having two side rails separated by a bed width, the side rails having side rail tops defining a bed height and a bed volume, the pickup truck also having a cab profile and a cab height, a rear view mirror, and a third brake light, the storage box comprising:

a body having a top surface, a first and second bottom surface, a storage box height, a storage box width, and two bottom ends disposed separated from one another by such bed width;

the two bottom ends being dimensioned and configured to mount to such side rail tops, whereby;

the storage box takes up no space between such bed side rails within such bed volume;

a rear view tunnel passing through the body, the rear view tunnel located between the two bottom surfaces, the rear view tunnel rising above such bed height so as to be dimensioned and configured to allow usage of such rear view mirror.

It is therefore yet another aspect, advantage, objective and embodiment of the invention to provide a tool box/storage box for use on a pickup truck having a bed, the bed having two side rails separated by a bed width, the side rails having side rail tops defining a bed height and a bed volume, the pickup truck also having a cab profile and a cab height, a rear view mirror, and a third brake light, the storage box comprising:

a body having a top surface, a first and second bottom surface, a storage box height, a storage box width, and two bottom ends disposed separated from one another by such bed width;

the two bottom ends having a plurality of feet dimensioned and configured to mount to such side rail tops, whereby;

the storage box takes up no space between such bed side rails within such bed volume;

a rear view tunnel passing through the body, the rear view tunnel located between the two bottom surfaces, the rear view tunnel rising above such bed height so as to be dimensioned and configured to allow usage of such rear view mirror.

It is therefore yet another aspect, advantage, objective and embodiment of the invention to provide a storage box for use on a pickup truck having a bed, the bed having two side rails separated by a bed width, the side rails having side rail tops defining a bed height and a bed volume, the pickup truck also having a cab profile and a cab height, a rear view mirror, and a third brake light, the storage box comprising:

a body having first and second top surfaces, a bottom surface, a storage box height, a storage box width, and two bottom ends disposed separated from one another by such bed width;

the two bottom ends having a plurality of feet dimensioned and configured to mount to such side rail tops, whereby;

the storage box takes up no space between such bed side rails within such bed volume;

a rear view tunnel passing through the body, the rear view tunnel located between the two top surfaces, the rear view tunnel dimensioned and configured to allow usage of such rear view mirror by being lower than such cab height.

It is therefore yet another aspect, advantage, objective and embodiment of the invention to provide a tool box wherein the storage box is further dimensioned and configured to match such cab profile of such pickup truck, whereby aerodynamic drag of the storage box is minimized.

And it is yet another aspect, advantage, objective and embodiment of the invention to provide a tool box/storage box for use on a pickup truck having a bed, the bed having two side rails separated by a bed width, the side rails having side rail tops defining a bed height and a bed volume, the pickup truck also having a cab profile and a cab height, a rear view mirror, and a third brake light, the storage box comprising:

a body having a top surface, a first and second bottom surface, a storage box height, a storage box width, and two bottom ends disposed separated from one another by such bed width;

the storage box height being less than ¾ of such cab height;

the two bottom ends being dimensioned and configured to mount to such side rail tops, whereby;

the storage box takes up no space between such bed side rails within such bed volume.

And it is yet another aspect, advantage, objective and embodiment of the invention to provide a tool box/storage box further comprising:

a third brake light visibility feature.

And it is yet another aspect, advantage, objective and embodiment of the invention to provide a storage box wherein the third brake light visibility feature further comprises:

a channel across the top surface, the channel dimensioned and configured to allow such third brake light of such pickup truck to be visible despite the presence of the storage box.

It is yet another aspect, advantage, objective and embodiment of the invention to provide a storage box, the pickup truck further having a power output for an auxiliary brake light, and further wherein the third brake light visibility feature further comprises:

an electrical connector to such power output, and at least one auxiliary brake light attached to the storage box and powered by the electrical connector.

It is yet another aspect, advantage, objective and embodiment of the invention to provide a storage box, further comprising: a storage-box-to-cab fairing extending from the storage box to the cab.

It is yet another objective, aspect, advantage, and embodiment of the invention to provide a storage box, further comprising:

a rear-view camera upon the body, the rear-view camera disposed so as to have a field of view similar to such rear view mirror.

It is yet another objective, advantage, aspect, and embodiment of the invention to provide a storage box, further comprising:

at least two side-mounted hatches, each side-hatch mounted vertically on the body and dimensioned and configured to swing open horizontally without causing any opening of the top surface.

It is yet another objective, advantage, aspect, and embodiment of the invention to provide a storage box, further comprising a door latch on each side-mounted hatch.

It is yet another objective, advantage, aspect, and embodiment of the invention to provide a storage box, further comprising:

at least one removable shelf disposed within the body.

It is yet another objective, advantage, aspect, and embodiment of the invention to provide a storage box, wherein the top surface further comprises:

a lifting top hatch.

It is yet another objective, advantage, aspect, and embodiment of the invention to provide a storage box, further comprising:

a bed illumination light attached to the storage box and disposed so as to illuminate such bed of such pickup truck, the bed illumination light also being attached powered by the electrical connector.

It is yet another objective, advantage, aspect, and embodiment of the invention to provide a storage box having multiple sets of interchangeable feet, each set of interchangeable feet being adapted, dimensioned and configured to mechanically engage to one such make/model of such pickup truck.

BRIEF DESCRIPTION OF THE DRAWINGS

FIG. 7 is a partially cut-away side view of an embodiment of the invention with another motorcycle for cargo, while

INDEX TO REFERENCE NUMERALS

Figure 1:
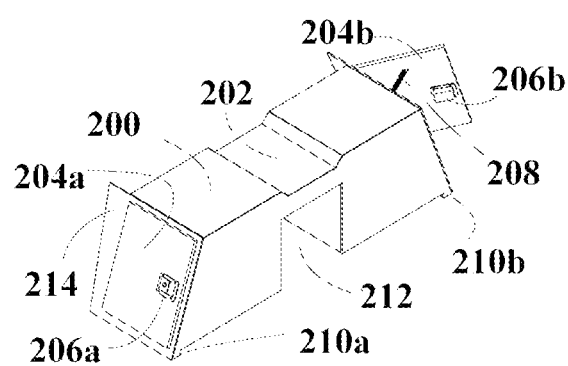
FIG. 1 is an elevated orthogonal view of a preferred embodiment of the toolbox of the present invention.

Side rail 10
Arm 12
Tonneau cover (special size) 14
Bed volume 20
Top opening hatch 50
Cab 54
Conventional toolbox 99
Body 100
Motorcycle 114
Motorcycle rear wheel 114*b*
Liddy light (CHSML) 120
First embodiment 200
Pickup 201
Brake light valley 202
Gate 203
Side-mounted hatches 204*a*, 204*b*
Door latches 206*a*, 206*b*
Door spring lock 208
Feet 210*a*, 210*b*
Rear view tunnel 212
Toolbox-to-cab fairing 214
Side shelves left/right 216*a*, 216*b*
Center shelf 218
Horizontal motion of removable shelf 220
Vertical space 222
Truck bed (vacant) 224
Sliding tonneau cover 226
Body 300
Top hatch 301
Auxiliary brake lights 302
Bed illumination light 304
Wiring 306
Camera 308
Box bottom surface fixed on rail top 410*a*, 410*b*, 410*c*, 410*d*
Bottom surface (unbroken) 412
Bottom surfaces first & second 512*a*
Tunnel, elevated bottom surface 514
Box bottom surface ends 620, 622
Body 624
Truck CHSML 626
Truck rear view mirror 628
Body 700
Brake light valley 702
Side-mounted hatches 704*a*, 704*b*
Door latches 706*a*, 706*b*
Door spring lock 708
Rear view tunnel 712
Storage box-to-cab fairing 714
Body 800
Brake light valley 802
Side-mounted hatches 804*a*, 804*b*
Door latches 806*a*, 806*b*
Door spring lock 808
CHSML/Rear view cam/bed light combined 812
Storage box-to-cab fairing 814
Body 900
Interchangeable feet sets 902, 904, 906, 908
Body 1000
CHSML/accessory 1002
Body 1100
LED light 1102
Half height body 1200
Bed side rail height 1202
Cab height 1204
Body 1300
Side doors 1302
Feet 1306
Body 1400
Top door 1402

DETAILED DESCRIPTION

Glossary

As used herein a toolbox is a container specialized for holding tools, having characteristics which suit it for this particular purpose and make it preferable to general purpose containers. Thus most toolboxes are made of extremely durable materials such as sheet metal (and the toolbox of the present invention is also made of sheet metal stock in the preferred embodiment) or of extremely rugged polymers. For example, aluminum and steel and alloys of either one may be preferable. Toolboxes normally have provisions for locking mechanisms to prevent theft of tools, usually have divided spaces to allow sorting of tools by type or size and so on.

As used herein a pickup truck is a vehicle having a cab for human occupancy with a bed behind the cab. The bed normally is a large volume for hauling cargo, the volume defined by the side walls on either side. Many pickup trucks in fact sacrifice a second row of seats in order to extend the bed and thus increase cargo capacity. In addition, pickup trucks are distinguished from flat-bed trucks by having raised side-rails on each side of the bed and separated by the width of the bed. The side-rails allow cargo to be secured more easily, and small, heavy cargo can even be placed into the truck bed without further securing. Larger cargo, such as the motorcycle shown in the accompanying figures, may be secured by means of apertures or tie downs mounted on the side rails. These rail apertures may also be used to receive the feet of the present invention.

As used herein the term cab profile refers to the frontal view in both area and shape of the cab portion of the pickup truck. This cab profile may be seen in the accompanying diagrams. It will be appreciated that a key determiner of vehicular gasoline efficiency is frontal area and shape. In order to maximize fuel efficiency, the toolbox of the present invention is designed to mimic the cab profile both in frontal view area and frontal view shape, as can be seen in the accompanying diagrams. Note that is a general mimicry only, as the rear-view tunnel, and the brake light channel both alter the profile of the toolbox as shown in the diagrams to be smaller than the profile of the cab depicted, and to remain within the cab profile. Thus the toolbox profile may exactly match, partially match, be similar to, or simply sit within, the profile of the cab of the pickup truck.

A rear view mirror for the present disclosure's purposes refers to that mirror which is mounted within the cab and used to view either the bed of the pickup truck or the area behind the vehicle.

Usage of such rear view mirror refers to the ability of a vehicle driver, seated normally in the driver's seat of the cab, to look into the mirror and see some or all of the normal view offered by the mirror due to the presence of the rear view tunnel through the bottom surface of the body of the toolbox of the invention.

The rear view tunnel is an inverted channel, having a length and width, passing across the bottom surface of the body of the toolbox entirely from front to back and thus allowing the normal usage of the rear view mirror.

The "third brake light" or "Liddy light" (in honor of the individual who required their introduction) or technically the CHMSL, "center high mounted stop lamp" refers to a vehicular safety light used for indicating that the brake pedal has been pushed. In the past, two lights, mounted on the side rails at the rear end of the pickup truck, were normal. The third brake light, mounted upon the top, center, rear of the cab of a vehicle, added significantly to the visibility of such lights and thus increased vehicular safety. It is estimated that the reduction in rear-end collisions may be as high as 5% due to Liddy lights. Given the fact that car crashes in the US (all types, not just rear end collisions) kill 40,000 Americans per year, even a slight reduction in one type of crash is obviously cost effective.

For purposes of this application, "bed side rail height" refers to the top of the side rails of a pickup truck bed. Thus the bed height/bed side rail height is usually a visual straight line backward from the cab. A "cab height" is the further distance from the bed height up to the top of the cab, which distance is usually taken up by a large rear window of the cab. Fractions of a cab height may be used for storage boxes having a lower profile than the pickup truck profile.

Also the terms "storage box" and "tool box" are used interchangeably in the claims and specification, since a tool box is actually just a storage box for tools, and the device of the invention may be used with construction or landscaping materials, sporting goods, clothing, food, car tools, etc, etc.

For purposes of this application, feet are defined to be objects mounted on an objects' bottom surface which stabilize and/or attach the object the surface upon which it rests. Thus, the feet of the present invention are dimensioned and configured to secure the body of the invention to the side rails of the pickup truck, and to hold suspended out of the bed of the pickup truck so that the bottom surface of the body of the present invention does not drop down to the top of the side rails and thus never enters the bed volume.

For purposes of this application "dimensioned" will refer to different sizes (for example different sizes of feet to match different truck brands' rail tops), and "configured" will refer to shapes of an element of the dimension.

In one preferred embodiment of the invention the feet may be substantially flat areas or apertures in the bottom of the body of the storage box, with a variety of different feet available to customize the box to a wide range of different pickup truck side rail tops. The storage box might have no feet built-in as part of the body, with the customized feet added by a seller, re-seller or consumer based on the model of pickup truck to which the storage box is to be affixed.

Vertical clearance: note that in one preferred embodiment of the invention, the feet actually hold the bottom surface of the body of the invention sufficiently above the height of the rails (vertical clearance) so that the invention does not impede the normal usage of a tonneau cover for the bed.

The feet of the invention may fit the shape of the top of the side rails, or they may enter apertures on the side rails' top surfaces, or may engage tie downs, all of which will be considered to be dimensioned and configured to secure to the side rails. Bolts, tie-downs, latches, holds, ties, chains, cables, fasteners and the like may be parts of the feet or truck.

A channel is defined, for purposes of this invention, to be a depression having both a length and a regular width. The width of the channel across the top surface may advantageously be sufficient to allow those behind the pickup truck to see the Liddy light despite the presence of the raised toolbox of the invention. The length of the channel should be sufficient for it to extend across the top surface from front to back, so as to avoid blocking the view of the CHMSL.

For purposes of this invention, a fairing is an aerodynamic device designed to reduce drag. In the present invention, the toolbox-to-cab fairing is designed to cover a gap which would exist between the back side of the cab and front side of the body of the toolbox. (This gap exists because pickup truck beds are slightly separated from the back of the cab, and of course because the feet of the invention, resting on and secured to the side rails, may require the body to be slightly removed from the cab.) Use of the fairing will prevent the formation of vortices in which air is captured and swirled into the gap behind the cap.

A hatch refers to a doorway which may be opened to retrieve tools from within the toolbox of the invention. A side-mounted hatch mounted vertically is a hatch specifically NOT opening up the top surface of the invention but instead opening up the side of the invention. Note that on conventional pickup truck mounted toolboxes, locating such doors on the side of the body would be pointless as the sides of conventional toolboxes sit inside of the volume of the bed and up against the interior sides of the side rails, and beyond being hard to reach would probably be impossible to open.

A shelf, for purposes of this invention, is removable when a user may easily detach it and slide it sideways or remove from the toolbox entirely, thus ceasing to partition an interior body volume and instead creating a single larger volume.

End of Glossary

FIG. 1 is an elevated orthogonal view of a preferred embodiment of the toolbox of the present invention. In the presently preferred embodiment and best mode presently contemplated for carrying out the invention, the first embodiment toolbox body 200 of the invention may have a brake light valley 202 entirely crossing the top surface from front to back and thus rendering the third brake light visible behind the truck.

Side-mounted hatches 204*a* and 204*b* may be seen: 204*a* is visible on the outside, nearside, and closed. On the other hand hatch 204*b* may be seen on the far side, visible on the inner side, and partially open.

The use of side-mounted hatched immediately renders the toolbox of the invention convenient for access: the user may stand and look at approximately chest height instead of bending over and rummaging at waist height. Side access by means of the side hatches 204*a* and 204*b* furthermore allows the use of shelving. Yet further, the user does not have to lift side-mounted vertical hatches to open and close them: the weight of a conventional vertically opened hatch is surprising, and in fact some prior art devices actually use gas shocks to aid the opening.

Door latches 206*a*, 206*b* may be seen, again from front and back sides. The latches lock, a virtual necessity, as theft rates on construction and work sites can also be rather surprising and tools are quite expensive.

Rather than a gas shock or a prop, door spring lock 208 suffices for the vertically mounted hatches 204*a*, 204*b*. The spring may be rather long and flexible and may be secured at opposite ends to the interior side of the hatch and the interior of the toolbox. In use, this type of spring may be pulled and elongated to open the hatch, but when the hatch is pushed open to the point at which the spring bends against the hatch hinge, the spring 208 may begin to act to hold the door open.

The side rails of the pickup truck bed, which define the volume thereof, allow the bottom surface of the toolbox to support the toolbox body entirely outside (above) the bed volume. The bottom surface may then have bottom ends which may secure the toolbox to the siderails, or may have securing points thereon, which securing points may then support the toolbox. Advantageously, the securing points may be feet.

Feet 210*a*, 210*b* may be seen and are instrumental in making the invention useful. It will be understood that the feet secure to the tops of the side rails and may be dimensioned and configured to various type of pickup truck hard points, which include but are not limited to tie down, apertures, posts and other devices. The feet secure to the side rails at these points, or may secure to the side rail by clamping action, or may simply be dimensioned and configured to match the contour of the top of the side rails. In general, the shape of the feet may depend upon the exact model of pickup truck involved and the exact type of securing arrangements it has.

In addition, pickup truck beds come in a variety of widths. The feet may be disposed by a separation distance of the width of the bed. Thus for narrower beds, the feet will be closer to the center, while for wider beds the feet may be further apart. This may be accomplished with movable feet, by having different models of toolboxes for different pickups (one preferred embodiment) and in other ways.

Figure 9:
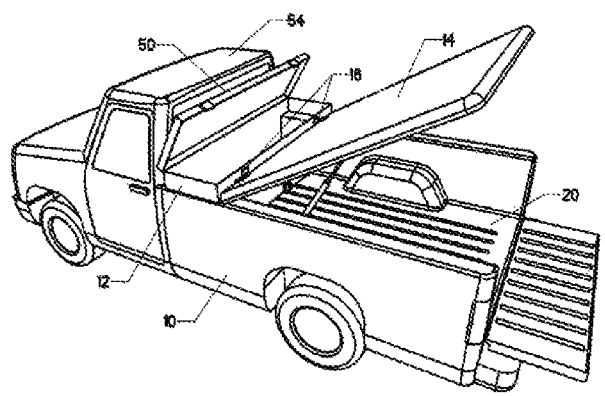
FIG. 9 is a PRIOR ART diagram showing a conventional pickup truck toolbox opening on the top and with a special tonneau cover which is shorter than the overall bed length.

Furthermore the feet 210*a* and 210*b* may provide a vertical clearance between the bottom of the box and the top of the side rails of the truck bed. This allows the use of rolling type tonneau covers without any change to the toolbox. (Note that in alternative embodiments a lifting type covers such as that shown in FIG. 9 (Prior Art) may be used with a sloped bottom surface of the tool box to allow the tonneau to swing up under the bottom of the toolbox, however, this is not the presently preferred embodiment.)

Rear view tunnel 212 is another safety factor. The rear view tunnel 212 allows the driver to use the rear view mirror normally, and this normal usage provides inherent safety when backing up. This furthermore allows a view of the cargo being carried in the bed. The tunnel shown is merely exemplary, the tunnel can be of any useful width and profile. The "tunnel" may but does not need to be an actual aperture through the toolbox body, it may, as shown, simply be a channel rather like a larger mirror image of the brake light valley.

Toolbox-to-cab fairing 214 may be seen to help match the edge of the toolbox 200 to the profile of a cab. Since a small gap will be normal (due to the small gap between the bed/the securing points on the side rails and the back side of the cab) wind as the truck drives will be generated in a vortex which tries to swirl into the gap, increasing aerodynamic drag. A fairing, much like a fairing on an airplane or sports car, can prevent the swirl and the waste of energy.

Figure 2:
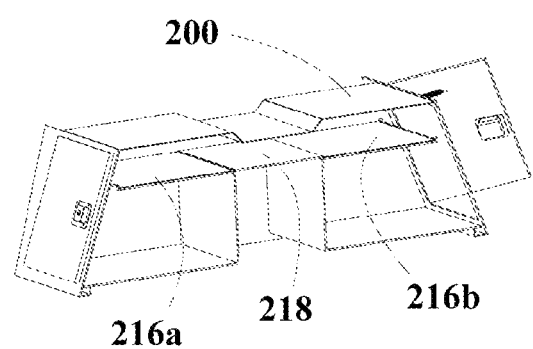
FIG. 2 is a low-elevation orthogonal view of the preferred embodiment of the toolbox of the invention with the back side removed to show the interior, one side-mounted hatch open, and several removable shelves displayed.
Figure 3:
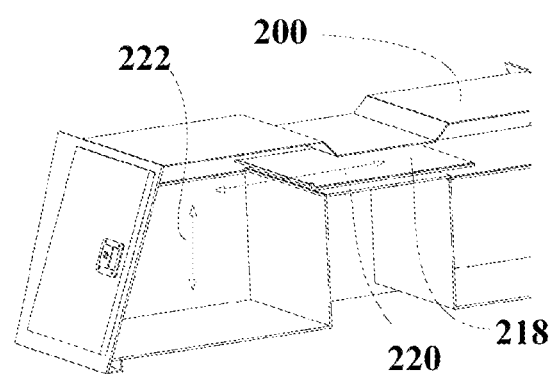
FIG. 3 is a partial low-elevation orthogonal view of the preferred embodiment of the toolbox of the invention with the back side removed to show the interior with one removable shelf moved, creating a larger space.

FIG. 2 is a low-elevation orthogonal view of the preferred embodiment of the toolbox of the invention with the back side removed to show the interior, one side-mounted hatch open, and several removable shelves displayed. Side shelves 216*a*, 216*b* (left and right) are on both sides of center shelf 218 and in the embodiment pictured actually combine to make a single long shelf across the entire width of the toolbox. In this view both the brake light valley and the rear view mirror tunnel may be seen clearly, as well as the ability of the toolbox to allow a wide range of customizations of the interior space. Obviously additional shelves may be employed at lower or higher levels than the shelves 216*a*, 216*b* shown. In addition, the shelves may reduced in number or entirely removed: FIG. 3 is a partial low-elevation orthogonal view of the preferred embodiment of the toolbox of the invention with the back side removed to show the interior with one removable shelf moved, creating a larger space. Horizontal motion of a removable shelf is depicted by arrow 220 as a user simply removes one shelf and pushed it to rest on another shelf. It may be seen that this then creates a considerably larger, unitary vertical space 222.

Figure 4:
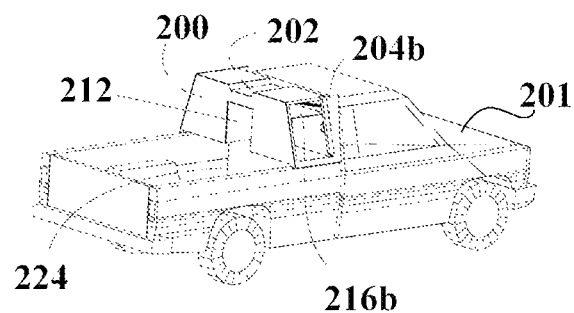
FIG. 4 is an oblique right-rear elevational view of a pickup truck having the device of the invention installed, with one side-mounted hatch open, showing the fact that the invention takes up none of the bed volume between the side walls.

FIG. 4 is an oblique right-rear elevational view of a pickup truck 201 having the device of the invention installed, with one side-mounted hatch open, showing the fact that the invention takes up none of the bed volume between the side walls. Truck bed 224 is seen to be vacant and completely available for cargo.

There is a trade off in terms of cargo space. While more bed volume is procured by means of the present invention, the space above the bed volume (above the side rails) is lost until the top of the toolbox is reached. However, in practical use, a pickup truck's bed volume, which is secured by side rails and the rear gate 203 (FIG. 7), is much more likely to be used on a daily basis, and is much more secure.

Figure 5:
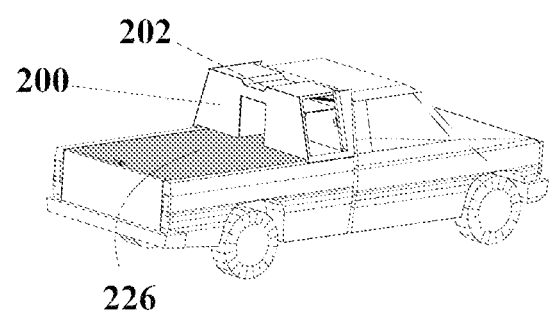
FIG. 5 an oblique right-rear elevational view of a pickup truck having the device of the invention installed, showing that a normal-sized tonneau cover may be employed with the device installed without interference.

FIG. 5 an oblique right-rear elevational view of a pickup truck having the device of the invention installed, showing that a normal-sized tonneau cover may be employed with the device installed without interference. Sliding tonneau cover 226 sits underneath the device of the invention due to the vertical clearance provided by the feet 210a, 210b (FIG. 1).

Figure 6:
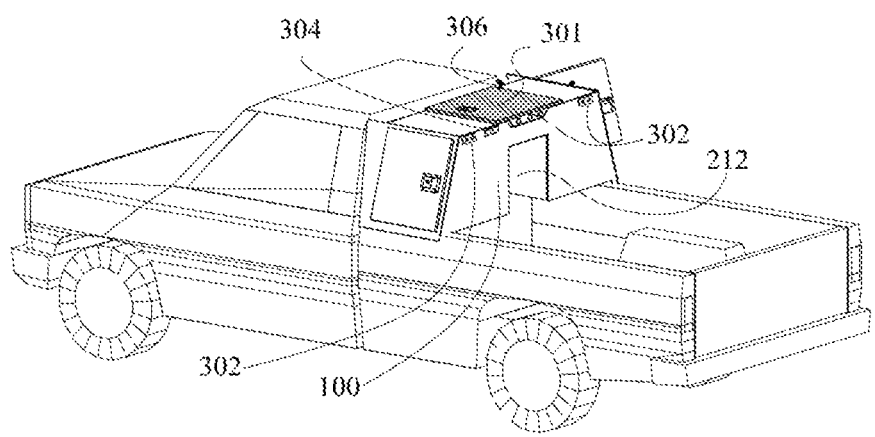
FIG. 6 is a left-rear oblique elevational perspective view of an alternative embodiment of the invention showing the space underneath available for cargo.

FIG. 6 is a left-rear oblique elevational perspective view of an alternative embodiment of the invention. Body 100 is seen in place. Cargo such as a motorcycle rear wheel (FIG. 8) might project slightly into rear view tunnel 212, if necessary, and other cargo may use the larger horizontal space under the rest of the toolbox and closer to the floor of the bed volume.

FIG. 6 also displays some optional parts which may become the preferred embodiment and best mode.

Top hatch 301 may be located anywhere on the top surface, may have a latch, and may lock. It may be used to access wiring, it may be used to access another compartment or the main compartment, it maybe hinged in various directions and may be any size from the full size of the toolbox down to quite small.

Third brake light 302 may be seen to be mounted on the toolbox, and may not be limited to a single light but can be several lights. Many modern pickup trucks have a wiring connector, for example, near the pickup truck's third brake light, which provides power to an auxiliary brake light mounted upon a camper, since campers tend to block the view of the third brake light. This camper wiring harness may be used for the toolbox of the present invention. Thus, the toolbox may have one or more auxiliary brake lights 302 which are powered by a wiring connector 306 which in turn is powered by the pickup truck's wiring connector. Thus the present invention may be mounted, plugged into the truck's pre-existing wiring connector and immediately have one or more additional third brake lights.

One potentially useful combination would be to have at least one auxiliary brake light mounted on each end of the toolbox, near the upper corners of the back side.

Further alternative embodiments include the use of a bed illumination light 304. This light is similar to the brake lights but it would be used not while driving but to illuminate the bed at night or in the dark. This light 304 might be white, yellow, or daylight spectrum in nature rather than being brake light color (which tends to be close to red). A switch may be provided.

Figure 7:
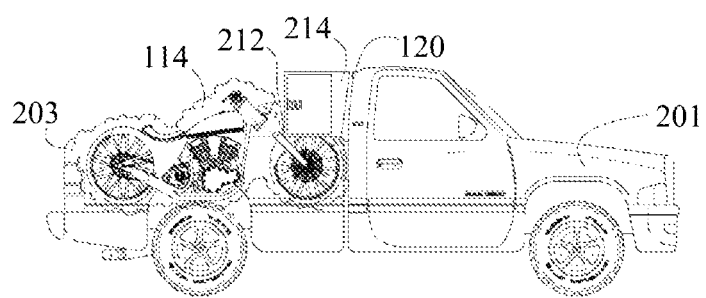
Figure 8:
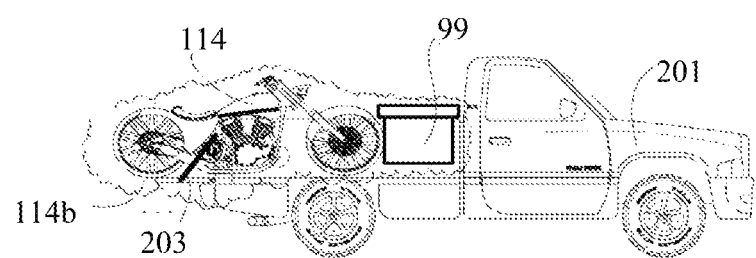
FIG. 8 is a PRIOR ART partially cut-away side view (equivalent to FIG. 7 in view) but showing the conventional toolbox and a top hatch door in use compared to the toolbox of the invention in FIG. 7.

FIG. 7 is a partially cut-away side view of an embodiment of the invention with another motorcycle for cargo, while FIG. 8 is a PRIOR ART partially cut-away side view (equivalent to FIG. 7 in view) but showing the conventional toolbox in use compared to the toolbox of the invention in FIG. 7. Conventional toolbox 99 (PRIOR ART, for example FIG. 8) sits down inside of the bed of the pickup truck, absolutely removing the forward part of the bed volume as usable space. By comparison, the box of the invention allows the use of that space and yet also allows for much easier and more efficient access to the items within the toolbox.

In particular, be comparing FIG. 7 and FIG. 8 side-by-side it may be seen that the gate 203 is OPEN for the PRIOR ART in order to make space to precariously balance motorcycle rear-wheel 114b, while for the invention, the gate 203 is closed and the motorcycle rear-wheel is securely disposed inside of it.

DODGE® and RAM® are trademarks whose owners are not associated with the present applicant. The present invention may be used with any type of pickup truck, regardless of manufacturer or model.

Figure 10:
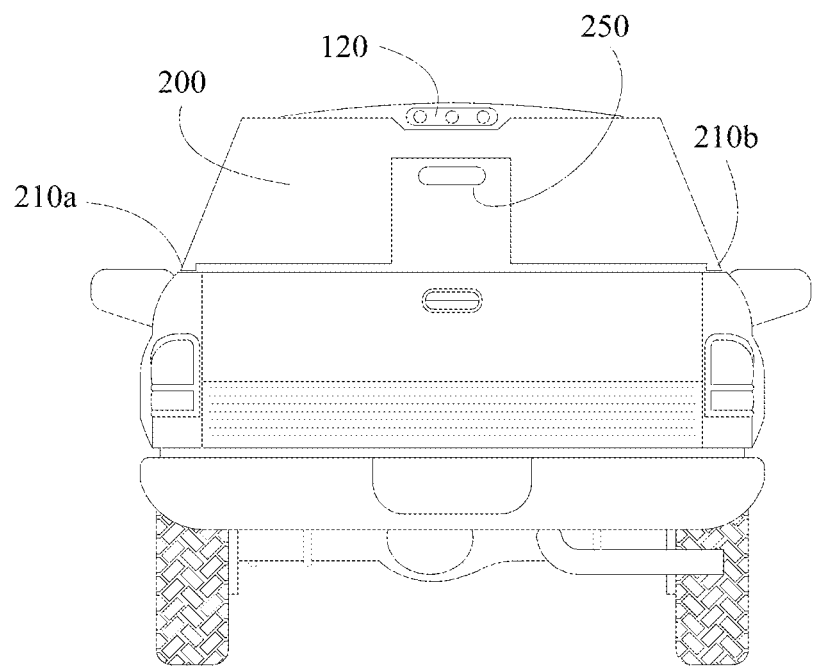
FIG. 10 is a rear view of the invention showing clearly the relationship of the tunnel, the rear-view mirror, the $3^{rd}$ brake light and the profile of the device.

FIG. 10 is a rear view of the invention showing clearly the relationship of the tunnel, the rear-view mirror, the $3^{rd}$ brake light and the profile of the device. In this embodiment of the device the body profile is still within the cab profile overall, but no longer closely follows it. Liddy light (CHSML, $3^{rd}$ brake light) 120 is plainly visible to any viewer, and the rear window of the cab is largely un-occluded. Importantly, rear view mirror 250 can be seen to have a clear field of view to the rear. Testing by the inventor has determined that proportions such as those shown in these diagrams are appropriate to provide a rear field of view from the mirror. Due to the short distance from the driver's eyes to the fairly narrow rear view mirror, the tunnel need to not be the entire width of the rear of the cab.

Figure 11:
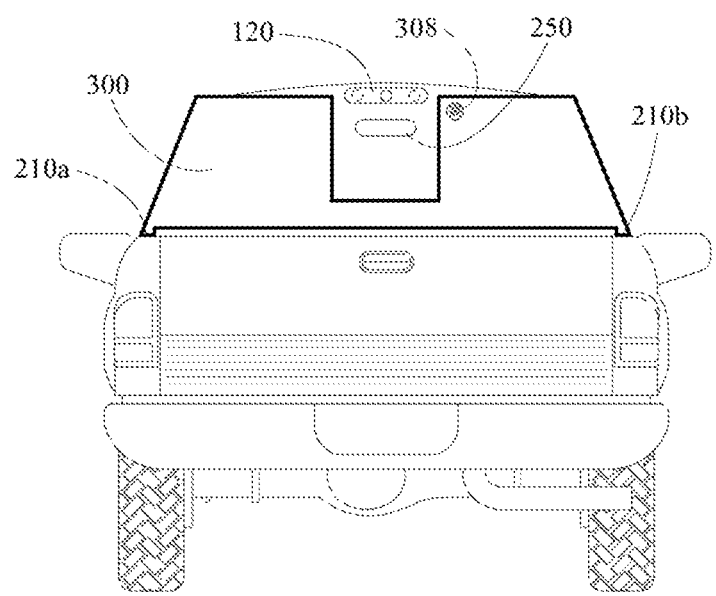
FIG. 11 is a rear view of the invention showing clearly the relationship of the a channel which is deep enough to function as the tunnel, the rear-view mirror, the $3^{rd}$ brake light and the profile of the device still substantially following the profile of the truck cab, as well as rear-view camera 308.

FIG. 11 is a rear view of the invention showing clearly the relationship of the a channel which is deep enough to function as the tunnel, the rear-view mirror, the $3^{rd}$ brake light and the profile of the device still substantially following the profile of the truck cab. Body 300 has in this embodiment a channel which is deep enough to allow rear view mirror 250 to be employed: the tunnel is inverted, comprising a deepening of the channel.

FIG. 11 also shows the camera 308. Rear view camera 308 may have a display (not shown) mounted in the cab of the truck, or may be used wirelessly, by network etc. The rear view camera 308 may have a field of view substantially similar to the field of view of the rear view mirror 250.

Figure 12:
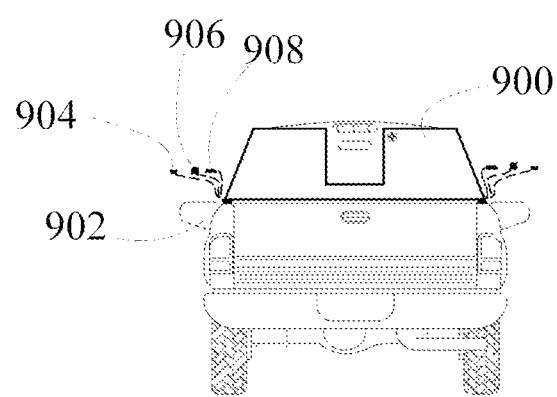
FIG. 12 is a rear view of the preferred embodiment of the invention showing a footless embodiment of the invention with interchangeable feet for different types of pickup truck.

FIG. 12 is a rear view of the invention showing a footless embodiment of the invention with interchangeable feet for different types of pickup truck. In this embodiment body 900 has no feet, however, a set of interchangeable feet, or adapters 902, are mounted under the body and atop the side rail, and connect the body to the side rail. This particular truck is a DODGE® model and so adapter feet 902 are dimensioned and configured to this particular make/model. Feet 904 on the other hand may be mounted in place of feet 902 so that the body 900 may be mounted to a different make or model. The same applies to feet adapter sets 906 and 908. For example, feet 904 might adapt to a standard size of GM® truck, while 906 and 908 might allow the storage/tool box to match to two different sizes of FORD® pickup trucks, and one set of feet might be generic to a family of trucks or several families of trucks.

In addition, different tonneau covers project different amounts above the top of the bed rails, and/or may project different distances to the side, so different feet in interchangeable sets may accommodate different tonneau covers as well as different models of truck.

Figure 13:
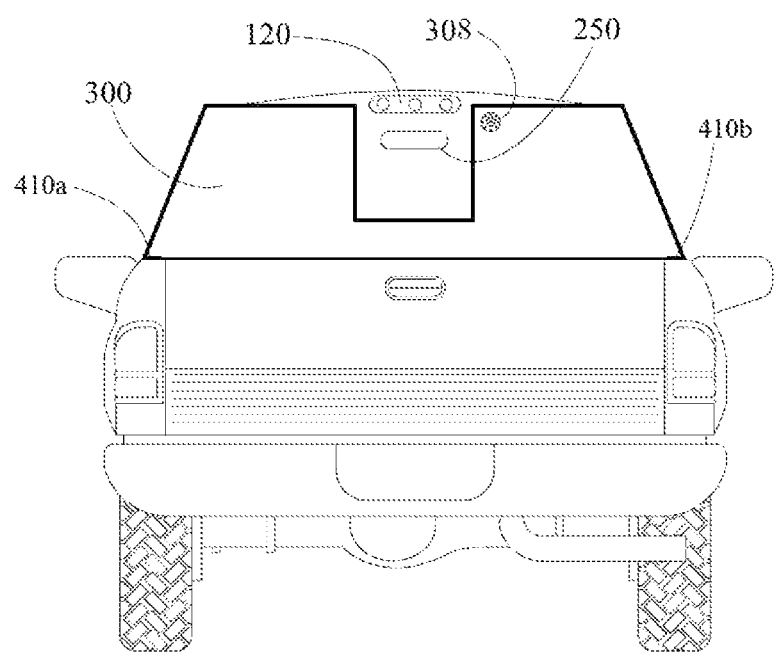
FIG. 13 is a rear view of the invention showing clearly the relationship of the tunnel interrupting the top surface, the rear-view mirror, the $3^{rd}$ brake light, profile, rear-view camera 308 and the lack of feet on this embodiment.
Figure 14:
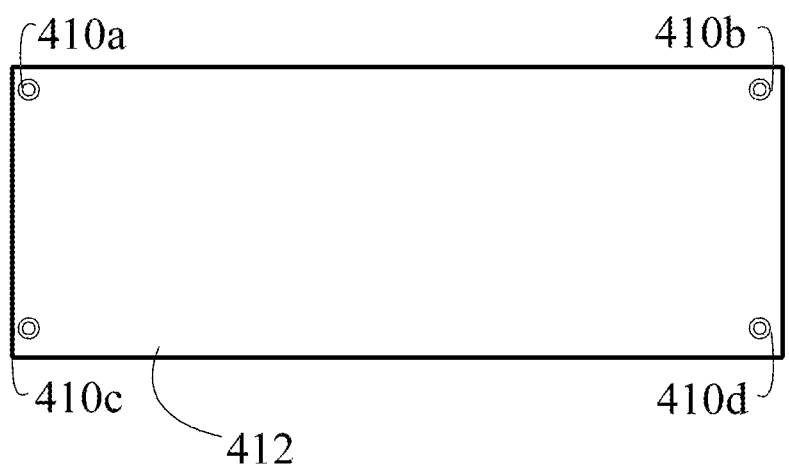
FIG. 14 is a bottom view of the invention in an embodiment having no bottom side tunnel.

FIG. 13 is a rear view of the invention showing clearly the relationship of the tunnel interrupting the top surface, the rear-view mirror 250, the $3^{rd}$ brake light, profile, and the lack of feet on this embodiment. The body 300 has a bottom surface which is fixed on the rail tops as shown by 410a, 410b. The unbroken bottom surface 412 is not visible in this diagram, being edge on. However, the rear view camera 308, the CHMSL 120, and other parts of the invention and the truck to which it is mounted may be seen. FIG. 14 is a bottom view of the invention in this embodiment having no bottom side tunnel. Box bottom surface 412 is unbroken from side to side for the width of the truck bed, and is fixed onto the rail tops by feet/securing points 410a, 410b, 410c, 410d. These may be as simple as apertures or may be more complex, as shown: threaded apertures, apertures with locking devices or collars/studs/pins, apertures which may be grommeted, and so on and so forth.

Legs or mounts may be used to then attach the storage box to the rails at the truck's mounting points, which are usually rather square holes in the top of the rails. These legs or mounts may be interchangeable, allowing one box to sit on more than one type/make/model of pickup truck.

Figure 15:
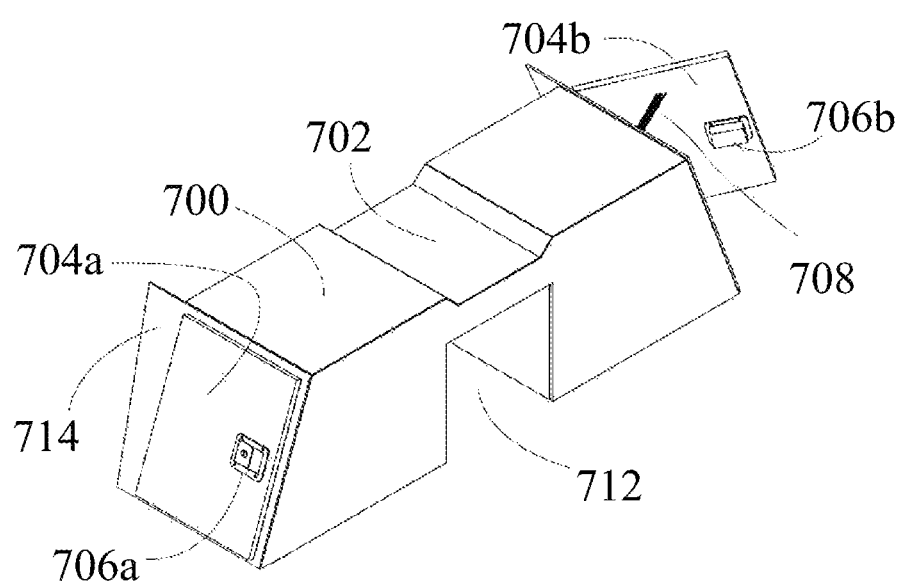
FIG. 15 is an elevated orthogonal view of a preferred embodiment of the toolbox of the present invention having no feet.

FIG. 15 is an elevated orthogonal view of a preferred embodiment of the toolbox of the present invention having no feet. Body 700 may have the brake light visibility feature 702, side-mounted hatches 704a, 704b, door latches 706a, 706b, door spring locks 708 and so on which may optionally be similar to the arrangements described earlier, for example, the advantageous mounting of the doors using vertical hinges so as to open horizontally (and be blown closed again if they happen to come unlatched while the truck is in motion and thus generating a slipstream.)

Rear view tunnel 712 may be seen in this embodiment to be a tunnel from the bottom surface of the device and interrupting that bottom surface to define two separate parts to the bottom surface, as shown in other diagrams. This tunnel may thus rise from the "bed height" (that is, the top of the rails as previously defined in the Glossary) to something a bit less than the "cab height" which is also the top of the storage box in embodiments in which it follows the profile of the truck cab.

Storage box-to-cab fairing 714 may provide a more aerodynamic and fuel efficient shape, again as discussed previously.

Figure 16:
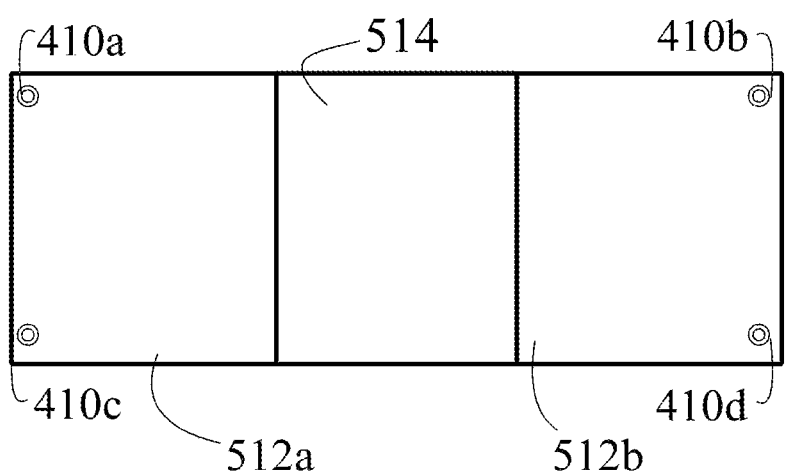
FIG. 16 is a bottom view of the invention in an embodiment having a bottom side tunnel.

FIG. 16 is a bottom view of the invention in an embodiment having a bottom side tunnel. Box bottom surface fixed on rail top (at mounting spots 410a, 410b, 410c, 410d) is interrupted by the tunnel and thus is actually two bottom surfaces (designated first & second, 512a 512b). The tunnel has an elevated bottom surface (really the ceiling of the tunnel or the bottom of the box body at that point) 514 which is higher up than bottom surfaces 512a/512b.

Figure 17:
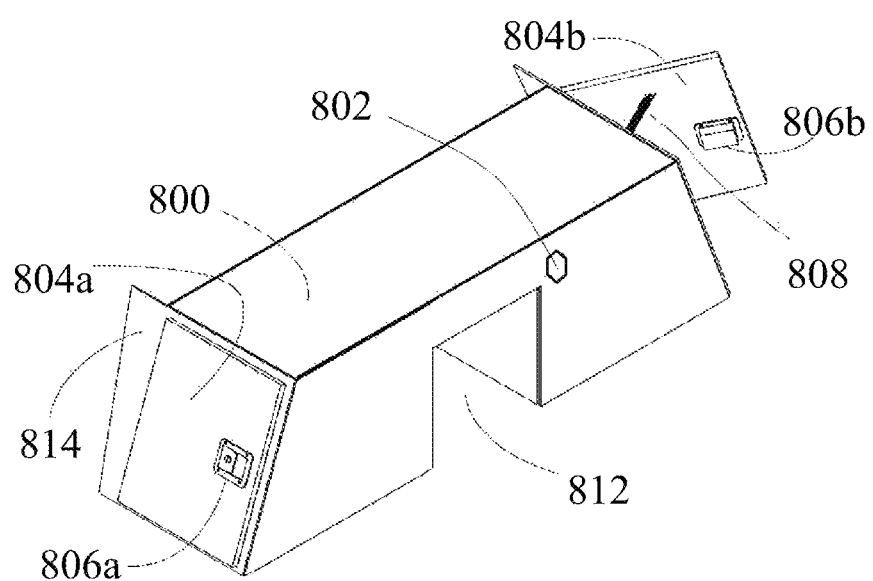
FIG. 17 is an elevated orthogonal view of a preferred embodiment of the toolbox of the present invention having no feet and no top-side channel.

FIG. 17 is an elevated orthogonal view of a preferred embodiment of the toolbox of the present invention having no feet and no top-side channel.

Body 800 once again a rear view tunnel 812, side-mounted hatches 804a, 804b, door latches 806a, 806b, door spring lock 808 (which again, is designed to shut the door if it comes open, and as a convenience for the user to shut the door), CHSML/Rear view cam/bed light combined 802, and the storage-box-to-cab fairing 814. Note that the combination of the two lights and the camera is optional only, for example, for aesthetic purposes, or to require only a single protective housing, etc etc.

Figure 18:
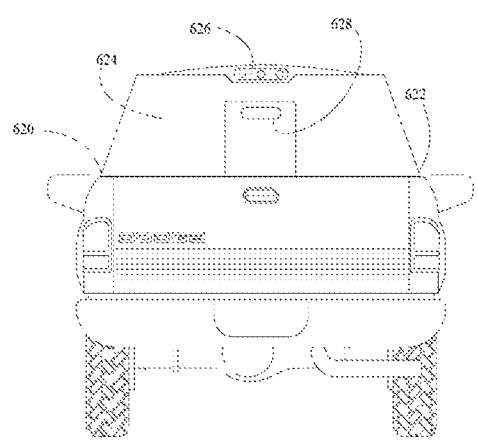
FIG. 18 is a rear view of the invention showing clearly the relationship of the tunnel interrupting the bottom surface, the rear-view mirror, the $3^{rd}$ brake light, profile, and the lack of feet on this embodiment.

FIG. 18 is a rear view of the invention showing clearly the relationship of the tunnel interrupting the bottom surface, the rear-view mirror, the 3$^{rd}$ brake light, profile, and the lack of feet on this embodiment. Box bottom surface ends 620, 622 support the body 624 of the box on the side rails of the bed, with the truck CHSML 626 and the truck rear view mirror 628 plainly visible and usable.

Figure 19:
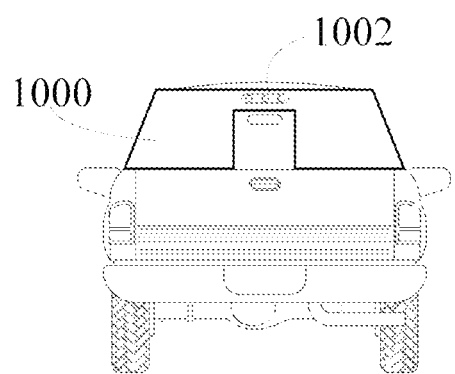
FIG. 19 is a rear view of the invention with an alternative Liddy light.

FIG. 19 is a rear view of the invention with an alternative Liddy light. Body 1000 has a different type of accessory housing 1002 which may house a brake light, bed light, camera, etc.

Figure 20:
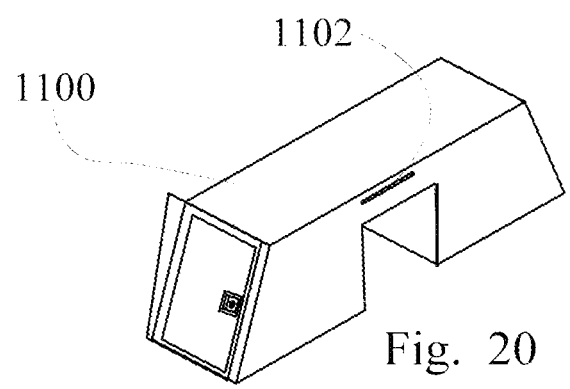
FIG. 20 is an elevated orthogonal view of an embodiment having an LED light.
Figure 21:
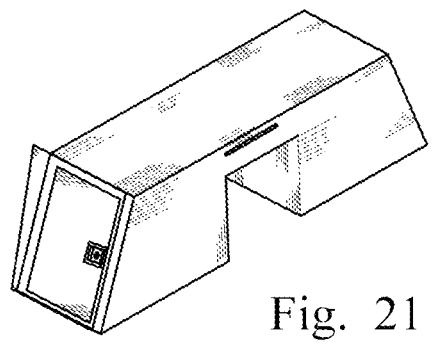
FIG. 21 is an elevated orthogonal view of an embodiment having an LED light as well.

FIG. 20 is an elevated orthogonal view of an embodiment having an LED light mounted on body 1100. The use of LED light 1102 may allow a battery operated, radio controlled, brake light, such as is often used on trailers. This allows use on trucks having no external brake wiring. FIG. 21 is another elevated orthogonal view of the embodiment having an LED light as well.

Figure 22:
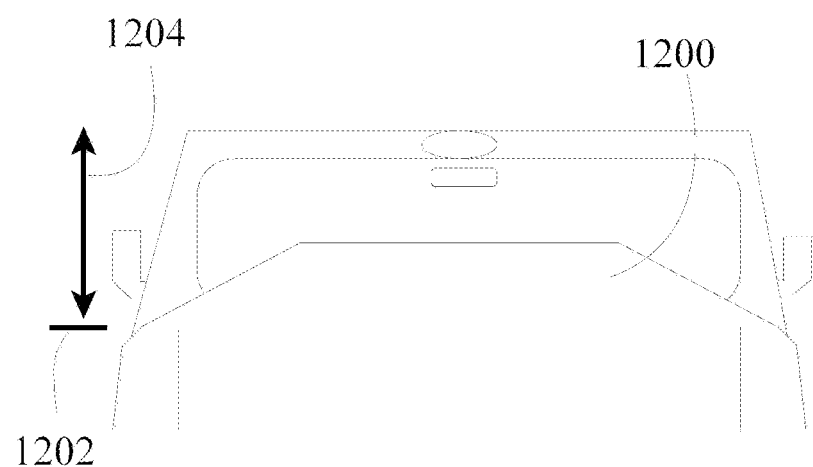
FIG. 22 is a rear view showing a lower height storage box according to the invention, and showing the "cab height".

FIG. 22 is a rear view showing a lower height storage box according to the invention, and showing the "cab height" and the "bed side rail height". Half height body 1200 is not exactly one half the height of the cab but rather a fraction of the height of the cab, and this cab height is not measured from the ground but rather from the bed height. Bed side rail height 1202 may be seen marked at the level of the top of the side rails, not the level of the bottom of the side rails.

Cab height 1204 is thus measured from bed side rail height (top of the side rails) to the top of the cab. This is the useful height for the storage box of the invention when it is desirable to minimize drag by matching the height and profile of the cab.

Figure 23:
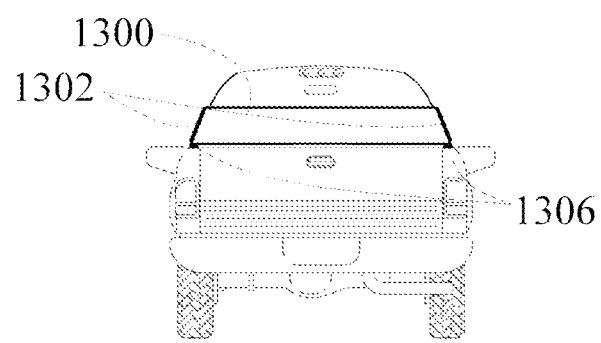
FIG. 23 is a rear view showing a lower height storage box according to the invention, in an actual embodiment having a set of side doors and feet.

FIG. 23 is a rear perspective view showing a lower height storage box according to the invention, in an actual embodiment having a set of side doors and feet. Body 1300 has side doors 1302 which match the general shape of the left and right ends of the device. The tool box/storage box of the invention generally matches the profile of the cab (due to perspective, it appears to bulge a bit on each side) but only up to the height of the box, then it simply is lower than the overall cab height (defined previously and depicted in FIG. 22). However, the half height embodiment (which may be ¾ height or lower), like previous embodiments, has no part which intrudes downward into the bed volume, and no part which intruded downward between the side rails.

Feet 1306 may be seen as with previous embodiments: these feet allow the use of a rolling tonneau cover.

Figure 24:
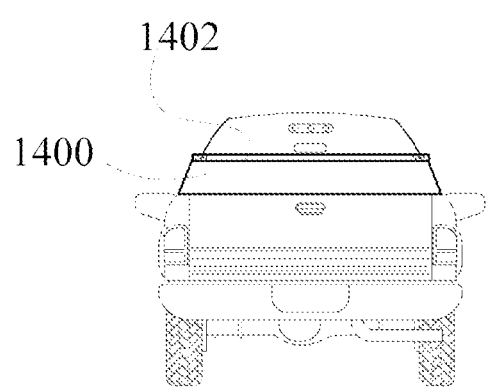
FIG. 24 is a rear view showing a lower height storage box according to the invention in an actual embodiment having a different door arrangement.

FIG. 24 is a rear view showing a lower height storage box according to the invention in an actual embodiment having a different door arrangement. Body 1400 has top door 1402. This embodiment lacks feet, making it less expensive to produce but disallowing the use of a full-size tonneau cover.

Note that the embodiment of FIG. 23 and the embodiment of FIG. 24 are different heights as measured from the bed side rail height. There is no requirement that the embodiments be exactly ½ of the cab height, or any other particular height, as long as they are a low fraction of the total height of the cab.

Production/manufacture of the device may utilize a riveted construction in which the device may be shipped in flat pieces, even palletized or the like for transport, then assembled with little more than a rivet gun. Construction from steel alloys, aluminum, corrugated or tread pattern metal and the like, durable polymers and so on may all be possible in embodiments. Welding may be employed, molding, blow molding, etc.

The device may be painted, coated, powder coated, treated, milled, buffed, shined, chromed or otherwise surface treated.

Throughout this application, various publications, patents, and/or patent applications are referenced in order to more fully describe the state of the art to which this invention pertains. The disclosures of these publications, patents, and/or patent applications are herein incorporated by reference in their entireties, and for the subject matter for which they are specifically referenced in the same or a prior sentence, to the same extent as if each independent publication, patent, and/or patent application was specifically and individually indicated to be incorporated by reference.

Methods and components are described herein. However, methods and components similar or equivalent to those described herein can be also used to obtain variations of the present invention. The materials, articles, components, methods, and examples are illustrative only and not intended to be limiting.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art.

Having illustrated and described the principles of the invention in exemplary embodiments, it should be apparent to those skilled in the art that the described examples are illustrative embodiments and can be modified in arrangement and detail without departing from such principles. Techniques from any of the examples can be incorporated into one or more of any of the other examples. It is intended that the specification and examples be considered as exemplary only, with a true scope and spirit of the invention being indicated by the following claims.

The disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

What is claimed is:

1. A storage box for use on a pickup truck having a bed, the bed having two side rails separated by a bed width, the side rails having side rail tops defining a bed height and a bed volume, the pickup truck also having a cab profile and a cab height, a rear view mirror, and a third brake light, the storage box comprising:
   a body having a top surface, a first and second bottom surface of the box each having a respective one of two footless bottom ends, a storage box height, a storage box width, and the two footless bottom ends disposed separated from one another by such bed width;
   the two footless bottom ends of the box being dimensioned and configured to mount to such side rail tops, whereby;
   the storage box takes up no space between such bed side rails within such bed volume;
   a rear view tunnel passing through the body, the rear view tunnel located between the two bottom surfaces of the box and the two footless bottom ends of the box, the rear view tunnel rising above such bed height so as to be dimensioned and configured to allow usage of such rear view mirror.

2. The storage box of claim 1, wherein the storage box is further dimensioned and configured to match such cab profile of such pickup truck, whereby aerodynamic drag of the storage box is minimized.

3. The storage box of claim 2, the pickup truck further having a power output for an auxiliary brake light, further comprising:
   a third brake light visibility feature, wherein the third brake light visibility feature further comprises:
   an electrical connector to such power output, and at least one auxiliary brake light attached to the storage box and powered by the electrical connector.

4. The storage box of claim 3, further comprising: a storage-box-to-cab fairing extending from the storage box to the cab.

5. The storage box of claim 4, further comprising:
   a rear-view camera upon the body, the rear-view camera disposed so as to have a field of view similar to such rear view mirror.

6. The storage box of claim 5, further comprising:
   at least two side-mounted hatches, each side-hatch mounted vertically on the body and dimensioned and configured to swing open horizontally without causing any opening of the top surface.

7. The storage box of claim 6, further comprising: a door latch on each side-mounted hatch.

8. The storage box of claim 7, further comprising:
   at least one removable shelf disposed within the body.

9. The storage box of claim 8, further comprising:
   a bed illumination light attached to the storage box and disposed so as to illuminate such bed of such pickup truck,
   the bed illumination light also being attached and powered by the electrical connector.

10. The storage box of claim 9, further comprising:
    a rear-view camera upon the body, the rear-view camera disposed so as to have a field of view similar to such rear view mirror, whereby the storage box has a rear-view camera, the bed illumination light, and the auxiliary brake light, and these three components are combined in a single housing.

11. The storage box of claim 2, further comprising:
    a third brake light visibility feature, wherein the third brake light visibility feature further comprises:
    a channel across the top surface, the channel dimensioned and configured to allow such third brake light of such pickup truck to be visible despite the presence of the storage box.

12. The storage box of claim 1, wherein the top surface further comprises:
    a lifting top hatch.

13. A storage box for use on a pickup truck of a make/model having a bed, the bed having two side rails separated by a bed width, the side rails having side rail tops defining a bed height and a bed volume, the pickup truck also having a cab profile and a cab height, a rear view mirror, and a third brake light, the storage box comprising:
    a body having a top surface, a first and second bottom surface of the box each having a respective one of two bottom ends, a storage box height, a storage box width, and two bottom ends disposed separated from one another by such bed width;
    the two bottom ends of the box each having a plurality of feet dimensioned and configured to mount to such side rail tops, whereby;
    the storage box takes up no space between such bed side rails within such bed volume;
    a rear view tunnel passing through the body, the rear view tunnel located between the two bottom surfaces of the box and thus also between the two bottom ends of the box and the plurality of feet, the rear view tunnel rising above such bed height so as to be dimensioned and configured to allow usage of such rear view mirror.

14. The storage box of claim 13, wherein the feet further comprise:
    multiple sets of interchangeable feet, each set of interchangeable feet being adapted, dimensioned and configured to mechanically engage to one such make/model of such pickup truck.

* * * * *